United States Patent [19]
Stephenson et al.

[11] 3,938,754
[45] Feb. 17, 1976

[54] VEHICLE SENSITIVE RETRACTOR WITH PENDULUM ON FLYWHEEL

[75] Inventors: Robert L. Stephenson, Sterling Heights; Yogendra Singh Loomba, Washington, both of Mich.

[73] Assignee: Allied Chemical Corporation, New York, N.Y.

[22] Filed: July 10, 1974

[21] Appl. No.: 487,331

[52] U.S. Cl. ............................ 242/107.4 A
[51] Int. Cl.² ............................ B65H 75/48
[58] Field of Search ............. 242/107.4–107.6; 280/150 SB; 297/386–388; 200/52 A, 61.58 B

[56] References Cited
UNITED STATES PATENTS

| | | | |
|---|---|---|---|
| 3,100,609 | 8/1963 | Wrighton | 242/107.4 |
| 3,604,655 | 9/1971 | Jones | 242/107.4 |
| 3,838,813 | 10/1974 | Bell | 242/107.4 |

*Primary Examiner*—Leonard D. Christian
*Attorney, Agent, or Firm*—John P. Kirby, Jr.

[57] ABSTRACT

The vehicle-sensitive retractor has an improved universal support assembly and inertia mechanism. The inertia mechanism is a pendulum assembly which includes a pendulum head in contact with an actuating means. The support assembly for the pendulum assembly includes a flywheel, a pendulum support, an axle for the flywheel and a flywheel support. The pendulum support upon which the pendulum head is disposed is mounted on the flywheel. The flywheel and pendulum assembly are adapted to pivot to a variety of operable static positions to which the pendulum assembly is automatically adjustable according to the position in which the retractor is oriented by virtue of installation in the vehicle. The axle for the flywheel is adapted to allow the flywheel to pivot. The flywheel support is mounted on the retractor and is adopted to support the flywheel and the flywheel axle. The retractor may be tilted for installation without having to redesign the pendulum assembly and support assembly.

6 Claims, 4 Drawing Figures

VEHICLE SENSITIVE RETRACTOR WITH PENDULUM ON FLYWHEEL

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allows the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engageable with a ratchet wheel on the belt reel. When the pendulum assembly is displaced from its normally vertical position by acceleration, deceleration or change in orientation of the vehicle, the pendulum assembly moves the pawl into engagement with the ratchet wheel, preventing further withdrawal of the belt. United States patent application Ser. No. 312,534 filed Dec. 6, 1972 in the name of Lon E. Bell, now U.S. Pat. No. 3,838,813, discloses an example of such a retractor.

It is important for the pendulum assembly to be in a substantially vertical position prior to actuation by acceleration, deceleration or change in orientation of the vehicle, so that the safety belt can be moved without locking the belt reel. It is desirable to have an improved, universal pendulum assembly and support assembly which are adjustable and do not need to be redesigned for different vehicles in order to have the pendulum assembly disposed vertically in its static position prior to actuation. This is desirable because the retractor needs to be mounted in various positions and various orientations within different vehicles. Sometimes the retractor needs to be turned partly on its side.

SUMMARY OF THE INVENTION

The retractor of this invention is vehicle-sensitive and inertia-operated. The retractor includes a reel for winding a safety belt, means to lock the reel and thereby restrain an occupant of the vehicle during emergency situations, a support structure which includes two side walls and a back wall, an improved inertia mechanism, an improved support assembly mounted on the retractor for supporting the inertia mechanism, and an improved actuating means responsive to the inertia mechanism for operating the means for locking the reel. The inertia mechanism is a pendulum assembly which includes a pendulum head in contact with the actuating means. The support assembly for the pendulum assembly includes a flywheel, a pendulum support, an axle for the flywheel and a flywheel support. The pendulum support upon which the pendulum head is disposed is mounted on the flywheel. The flywheel and pendulum assembly are adapted to pivot in one plane to a variety of operable static positions to which the pendulum assembly is adjustable according to the position in which the retractor is oriented by virtue of installation in the vehicle. The axle for the flywheel is adapted to allow the flywheel to pivot in one plane. The flywheel support is mounted on the retractor and is adapted to support the flywheel and the flywheel axle.

The flywheel has two weights disposed on opposing sides of the flywheel. The pendulum support is mounted on the flywheel and has a circular support edge upon which the pendulum head is disposed for pivoting movement of the pendulum assembly. The flywheel is supported by the flywheel support. The flywheel is adapted to pivot upon the flywheel axle in a plane perpendicular to the support member. As a result, the retractor has two separate pivoting actions: (1) the pivoting action of the pendulum assembly; and (2) the pivoting action of the flywheel. In response to inertia forces during emergency situations, the pendulum assembly may pivot upon the pendulum support in an infinite variety of lateral directions.

The actuating means is disposed above the pendulum head. Typically, the reel locking means includes one or more ratchet wheels and a pawl, although other reel locking means may also be used. The actuating means is an actuating post which has an unlocked position and a locked position. The actuating means is disposed in the unlocked position when the pendulum assembly is at rest in any one of its variety of operable static positions. The actuating means is moved to the locked position by pivoting movement of the pendulum assembly in any direction during emergency situations to engage the pawl in the ratchet wheels to lock the reel and prevent further unwinding of the belt from the reel.

The retractor has a longitudinal axis. The flywheel has a longitudinal axis which is approximately perpendicular to the plane of the pendulum support. The static position of the flywheel and pendulum support is adjustable in one plane which is perpendicular to the flywheel axle from a static position wherein the longitudinal axis of the flywheel is disposed at an angle of approximately 0° to an angle of approximately 30° with reference to the longitudinal axis of the retractor. The static position of the pendulum assembly is adjustable with the flywheel in the same plane from a static position wherein the longitudinal axis of the pendulum assembly is disposed at an angle of approximately 0° to an angle of approximately 30° with reference to the longitudinal axis of the retractor. The retractor further includes a support structure including two parallel side walls and a back wall. The flywheel support is disposed between and supported by the side walls. The inertia mechanism and support mechanism are universal and unique because they do not have to be redesigned for use in different vehicles in order to have the pendulum assembly disposed substantially vertically for the purpose of allowing the retractor to remain unlocked in normal operation. If the retractor is turned partly on its side, that is, tilted for installation, the static position of the pendulum assembly is adjustable to such tilted installation of the retractor and enables the pendulum assembly to be disposed substantially vertically.

DETAILED DESCRIPTION

Figure 1:
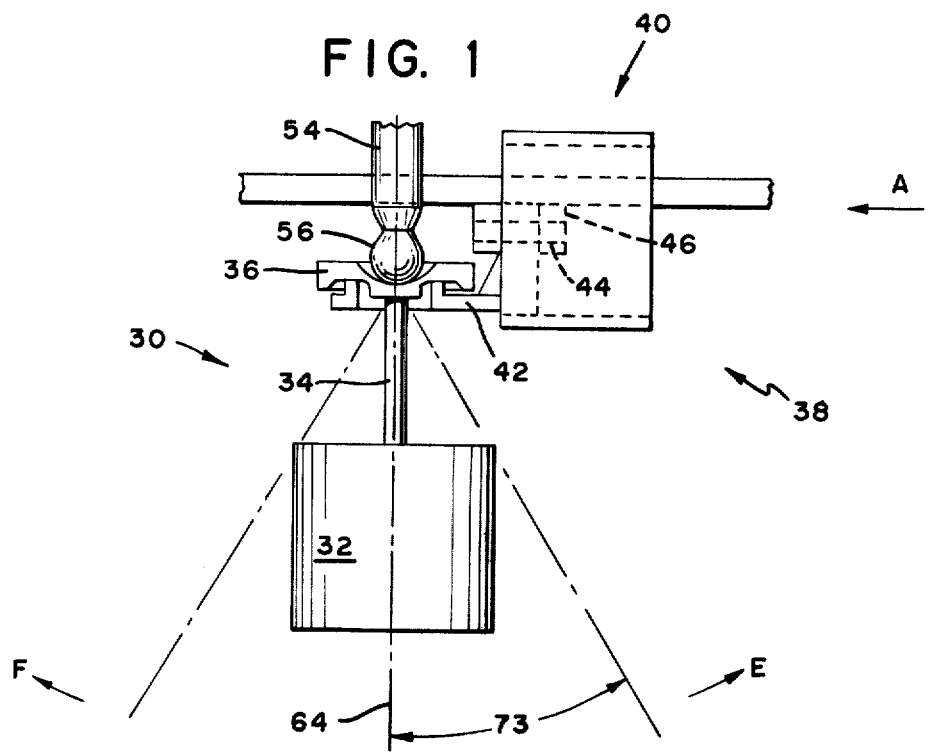
FIG. 1 is a front elevational view of the improved inertia mechanism, support assembly, and actuating means.

The retractor in which the improved inertia mechanism, support assembly and actuating means of this invention are adapted to be used is disclosed in co-pending patent application Ser. No. 487,330 filed July 10, 1974, entitled "Vehicle Sensitive Retractor with Double Pendulum," filed on the same date as the present patent application, in the name of R. L. Stephenson, R. Pfeiffer and Y. Loomba. The retractor has a reel means, including a reel shaft, rotatably mounted on a support means. The support means is a load bearing member and includes a mounting means in the form of a rigid extension adapted to be bolted or otherwise secured to an anchorage point in a vehicle.

A belt is adapted to be attached to the reel shaft for winding and unwinding thereon. The reel means includes a biasing means, such as a tension return spring, inside a housing, which urges the reel shaft to turn in a winding direction. The winding direction of the reel shaft retracts the belt into the retractor. The opposite unwinding direction of the reel shaft allows withdrawal of the belt from the retractor.

The two side walls of the support structure are disposed substantially parallel to one another and substantially perpendicular to the back wall. The support structure also includes a cross member extending between the side walls and at the opposite side of the side walls from the back wall. The retractor further includes a means for locking the reel means, such as a pawl and a ratchet means. The ratchet means includes at least one ratchet wheel and, preferably, two ratchet wheels. The ratchet wheels have ratchet teeth on their outer circumferences and are fixedly mounted on the reel shaft. The pawl is pivotally mounted on the side walls and extends between the side walls. The pawl is adapted to pivot from an unlocked position to a locked position. In the locked position, the pawl is pivoted into engagement with teeth of the ratchet wheels.

Referring to FIGS. 1 – 4, the retractor further includes an inertia mechanism, a support assembly for the inertia mechanism and an actuating member, all of which are adapted to cooperate to actuate the pawl from its unlocked position to its locked position during emergency situations. The inertia mechanism, support mechanism and actuating member may be mounted inside the retractor, as illustrated in the drawings, or may be mounted outside the retractor on the outer side of one of the side walls of the support structure. The inertia mechanism is a pendulum assembly and is indicated generally by the numeral 30. The pendulum assembly 30 includes a pendulum weight 32, a pendulum rod 34 and a pendulum head 36. The pendulum rod 34 has an upper end and a lower end. The upper end of the pendulum rod 34 is connected to the pendulum head 36. The lower end of the pendulum rod is connected to the pendulum weight 32.

The support assembly 38 (FIG. 1) for the pendulum assembly 30 includes a flywheel (indicated generally by the numeral 40), a pendulum support 42 for the pendulum head 36, an axle 44 for the flywheel 40, and a flywheel support 46 for the flywheel 40 and the flywheel axle 44. The pendulum head 36 is disposed on the pendulum support 42. The pendulum rod 34 extends from the pendulum head 36 through an aperture 50 in a pendulum support 42. The pendulum support 42 has an upturned, substantially circular support edge 52 around the circumference of the aperture 50. The pendulum head 36 is disposed on the support edge 52 of the pendulum support 42. The flywheel 40 and pendulum assembly 30 are adapted to pivot in one plane to a variety of operable static positions to which the pendulum assembly 30 is adjustable automatically according to the position in which the retractor is oriented by virtue of installation in the vehicle. The flywheel axle 44 is adapted to allow the flywheel 40 to pivot in a plane approximately perpendicular to the flywheel axle 44.

Figure 2:
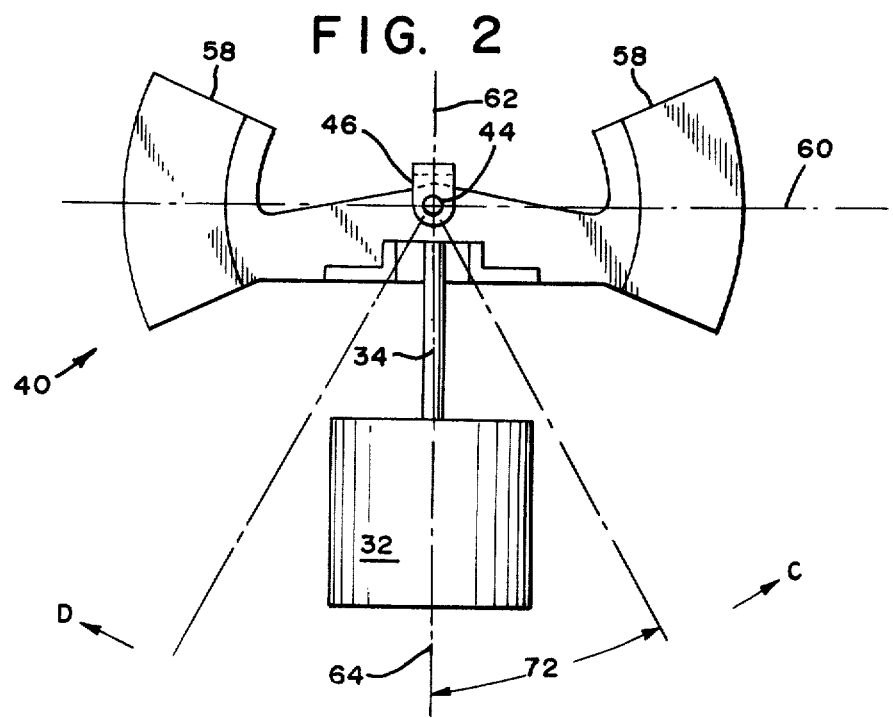
FIG. 2 is a side view of FIG. 1 in the direction of arrow A in FIG. 1.
Figure 3:
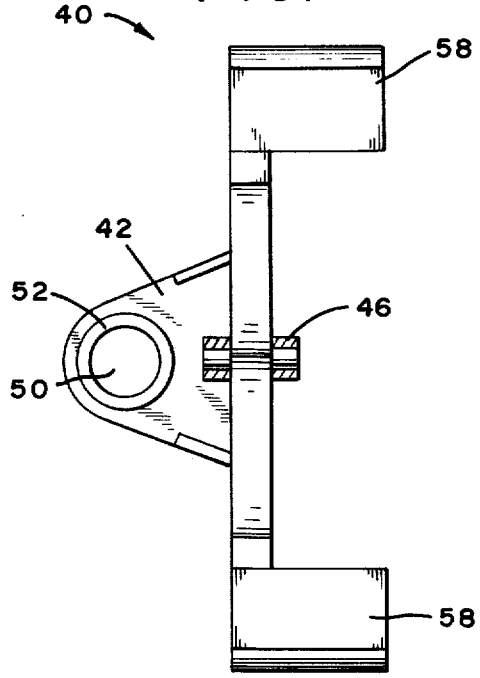
FIG. 3 is a top view of FIG. 1.
Figure 4:
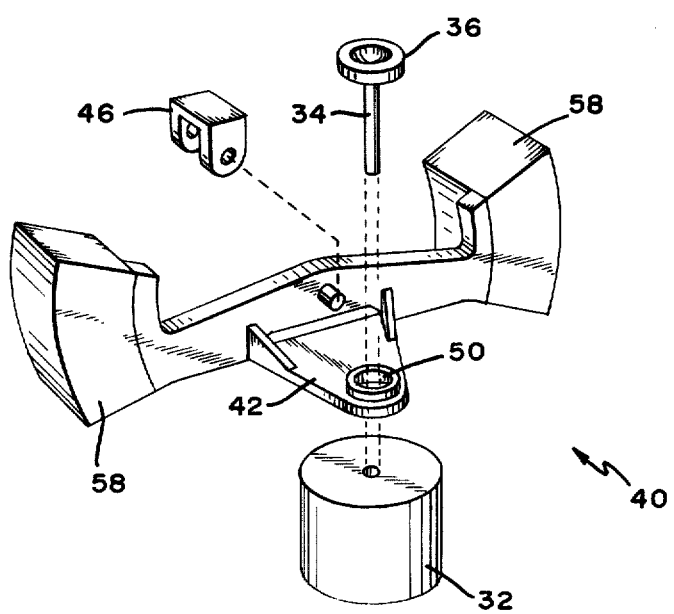
FIG. 4 is an isometric view of the improved inertia mechanism and support assembly.

The pendulum support 42 is fixedly mounted on the flywheel 40 and pivots with the flywheel 40. The flywheel 40 pivots independently of the pendulum assembly 30. As a result, the retractor has two pendulum mechanisms; one pendulum mechanism being pendulum assembly 30 and the second pendulum mechanism being flywheel 40. Thus, the retractor has two separate pivoting actions: The first pivoting action is between the pendulum assembly 30 and the pendulum support 42. The pendulum head 36 pivots on the substantially circular support edge 52 which allows the pendulum assembly 30 to pivot in an infinite variety of lateral directions. The second pivoting action is between the flywheel 40 and the flywheel axle 44. Referring to FIG. 2, the flywheel 40 pivots in two directions, clockwise (arrow D) and counter-clockwise (arrow C), in one plane by means of axle 44 with reference to flywheel support 46.

The actuating means is actuating post 54 disposed above the pendulum head 36. The post 54 is connected to the means of locking the retractor. The post 54 is connected to the lower side of the pawl. Preferably, the post 54 has a rounded portion 56 at its lower end which rests on the pendulum head 36. If the pendulum assembly 30 and support assembly 38 are mounted on the outer side of one of the side walls 10 of the support structure, the pawl 22 must extend through such side wall 10 to be actuated by the actuating post 54 or the pawl and a ratchet wheel must also be mounted on the outer side of one of the side walls 10.

The flywheel support 46 and the flywheel axle 44 are each disposed with their longitudinal axes substantially parallel to the longitudinal axis of the reel, substantially parallel to the back wall of the support structure and substantially perpendicular to the side walls of the support structure. The flywheel support 46 is fixedly mounted on and between the side walls and supports the flywheel axle 44 and the flywheel 40.

The flywheel 40 pivots through a plane substantially parallel to the side walls and substantially perpendicular to the back wall and the flywheel axle 44. The flywheel 40 has two weights 58 disposed on opposing sides of the flywheel 40. Referring to FIG. 2, the flywheel 40 has a lateral axis 60 in the plane of the flywheel 40, passing through the approximate center of the flywheel 40 and flywheel weights 58. The lateral axis 60 of the flywheel 40 is disposed substantially perpendicular to the flywheel axle 44, substantially perpendicular to the back wall of the support structure, and substantially parallel to the side walls of the support structure. The lateral axis 60 of the flywheel 40 is adapted to pivot from 0° to at least 30° from the horizontal plane. The flywheel 40 has a longitudinal axis 62 passing through the center of the flywheel 40 and substantially perpendicular to the lateral axis 60 of the flywheel 40.

The pendulum assembly 30 has a longitudinal axis 64 which is substantially parallel to the pendulum rod 34. When the retractor is mounted in the vehicle in a substantially vertical configuration, the longitudinal axis 64 of the pendulum assembly 30 in its static position is substantially parallel and coincident with the longitudinal axis 62 of the flywheel 40. The static position of the flywheel 40 and pendulum assembly 30 acting as one unit is adjustable automatically in two opposing directions, indicated by arrows C and D in FIG. 2, corresponding to clockwise and counterclockwise rotation of the flywheel 40, from a static position wherein the longitudinal axis 62 of the flywheel 40 is disposed at an angle of approximately 0° to an angle 72 of up to approximately 30° (FIG. 2), or any angle between 0° and approximately 30°, with reference to the longitudinal axis of the retractor or an axis substantially parallel to the axis of the retractor.

When the retractor is disposed in the vehicle so that the longitudinal axis of the retractor is substantially vertical, the flywheel 40 and pendulum assembly 30 assume an operable static position with the angle between both the longitudinal axis 62 of the flywheel 40 and the longitudinal axis 64 of the pendulum assembly 30 being 0° with reference to the longitudinal axis of the retractor. When the retractor is tilted in a direction substantially perpendicular to the flywheel support 46, that is, a direction indicated by arrows C and D in FIG. 2, and the longitudinal axis of the retractor is at an angle 72 (FIG. 2) of up to approximately 30° with the vertical plane, the flywheel 40 and pendulum assembly 30 assume an operable static position with the longitudinal axis 62 of the flywheel 40 and pendulum assembly 30 disposed at an angle 72 of up to approximately 30° with reference to the longitudinal axis of the retractor.

The retractor is not intended to be tilted in the direction E or F for installation in the vehicle because the flywheel 40 has no axis of axles upon which to pivot in these directions with reference to the support member 48. In contrast, when the retractor is tilted in a direction substantially perpendicular to the flywheel axis 42 and the support member 48, that is, a direction indicated by arrows C and D in FIG. 2, the longitudinal axis 62 of the flywheel 40 and the longitudinal axis 64 of the pendulum assembly 30 tend to remain substantially parallel to the vertical plane because the flywheel 40 has a flywheel axle 42 upon which to pivot and thereby adjust automatically.

Thus, the pendulum assembly 30 is capable of adjusting automatically to a variety of operable static positions in one plane. In all of the variety of operable static positions to which the pendulum assembly 30 is adjustable, the longitudinal axis 64 of the pendulum assembly 30 adjusts to a position approximately parallel to the vertical plane. It is the longitudinal axis of the retractor that assumes an angle with reference to the vertical plane. This adjustment of the flywheel 40 and pendulum assembly 30 takes place by means of the pivoting action between the flywheel 40 and the flywheel support 46 in two directions C and D in one plane. As a result, the retractor may be installed in a vehicle in a tilted configuration of up to 30° with reference to the vertical plane in directions C or D.

During normal operation of the retractor after installation, when the vehicle is not in a dangerous situation, the pendulum head 36 continues to rest on the support edge 52 in any one of its variety of operable static positions. During normal operation of the retractor when the vehicle is not in a dangerous situation, the pawl actuating post 54 rests in its unlocked position on top of the pendulum head 36. The actuating post 54 is connected to the underside of the pawl and the pawl remains in its unlocked position.

When the acceleration, deceleration or change in orientation of the vehicle exceeds a predetermined magnitude, the pendulum head 36 is lifted up and off the support edge 52. Such movement of the pendulum head 36 lifts the actuating post 54, which in turn lifts the engaging side of the pawl, causing the pawl to pivot into engagement with the ratchet wheels. Such engagement of the ratchet wheel 26 occurs when the pendulum assembly 30 pivots in any lateral direction upon pendulum support 42, including the directions of arrows E or F in FIG. 1 or arrows C or D in FIG. 2. Being a balanced flywheel, the acceleration or deceleration does not cause any rotation of the flywheel 40. The pendulum assembly 30 operates as a separate mechanism independent from the flywheel 40 during acceleration and deceleration.

The pendulum assembly 30 and flywheel 40 provide a simple, but effective, vehicle-sensitive, inertia-operated mechanism adapted to lock the retractor and thereby restrain an occupant of the vehicle during emergency situations. As a result, when the vehicle is subjected to sudden braking, cornering or overturning, for example, the pendulum assembly 30 causes the ratchet wheels to prevent the belt from being withdrawn any further from the retractor, thereby restraining the occupant of the vehicle wearing the safety belt. The pendulum assembly 30 and flywheel 40 are highly reliable in operation and inexpensive to manufacture. A typical location for this retractor is on the back of a seat where the angle of orientation of the retractor changes with the position of the seat.

We claim:

1. In a vehicle-sensitive, inertia operated safety belt retractor having a reel for winding a safety belt, means to lock the reel and thereby restrain an occupant of the vehicle during dangerous situations, a support structure which includes two side walls and a back wall, an inertia mechanism, a support assembly mounted on said retractor for supporting the inertia mechanism and an actuating means responsive to said inertia mechanism for operating the means for locking the reel; the improvement wherein:

said inertia mechanism is a pendulum assembly which includes a pendulum head in contact with said actuating means, said pendulum assembly being actuated by forces exceeding a predetermined magnitude resulting from a sudden change in the motion or orientation of the vehicle, said actuation means operating directly on the means for locking the reel; and said support assembly for said pendulum assembly includes: a flywheel; a pendulum support having a substantially circular support edge upon which said pendulum head is disposed, said pendulum assembly requiring a force exceeding a predetermined magnitude to lift a part of the pendulum head up and off a part of said support edge before said pendulum assembly will cause said locking means to lock the reel; said pendulum support being mounted on said flywheel, said flywheel and said pendulum assembly being adapted to pivot in one plane to a variety of operable static positions to which said pendulum assembly is adjustable according to the position in which the retractor is oriented by virtue of installation in the vehicle; an axle for said flywheel adapted to allow said flywheel to pivot in one plane; and a flywheel support for said flywheel and said flywheel axle, said flywheel support being mounted on said retractor.

2. The vehicle-sensitive, inertia-operated safety belt retractor according to claim 1 wherein:
said actuating means is an actuating post disposed above said pendulum head, said actuating post being connected to said means for locking said reel, said actuating post being disposed in an unlocked position when said pendulum assembly is at rest and said actuating post being moved to said locked position by said pendulum assembly during dangerous situations to lock said reel and prevent further unwinding of said belt.

3. The vehicle-sensitive, inertia-operated safety belt retractor according to claim 1 wherein: said flywheel includes two weights disposed on opposing sides of said flywheel.

4. The vehicle-sensitive, inertia-operated safety belt retractor according to claim 1 wherein:
said pendulum assembly is automatically adjustable in one plane from a static position wherein said longitudinal axis of said pendulum assembly is disposed at an angle of approximately 0° to an angle of approximately 30° with reference to the longitudinal axis of said retractor.

5. The vehicle-sensitive, inertia-operated safety belt retractor according to claim 1 wherein:
said pendulum assembly further includes a pendulum weight and a pendulum rod; and
said pendulum rod has an upper end and a lower end, said upper end of said pendulum rod being connected to said pendulum head, said lower end of said pendulum rod being connected to said pendulum weight.

6. The vehicle-sensitive, inertia-operated safety belt retractor according to claim 1 wherein:
said flywheel axle is disposed substantially parallel to said back wall and substantially perpendicular to said side walls; and
said flywheel pivots in a plane substantially parallel to said side walls and substantially perpendicular to said back walls.

* * * * *